United States Patent Office 2,942,004
Patented June 21, 1960

2,942,004

RESOLUTION OF 5,5-PHENYLETHYLHYDANTOIN

William T. Cave, Dayton, Ohio, assignor to Monsanto Chemical Company, St. Louis, Mo., a corporation of Delaware No Drawing. Filed May 9, 1956, Ser. No. 583,614

3 Claims. (Cl. 260—309.5)

The present invention is directed to a method of resolving a racemate of 5,5-phenylethylhydantoin into its optical isomers. The invention is also directed to solutions of the optical enantiomorphs of 5,5-phenylethylhydantoin which contain an excess of one enantiomorph and are useful intermediates in the resolution of the compound.

An object of the present invention is to provide a useful method of resolving racemic mixtures of 5,5-phenylethylhydantoin into its optical isomers. A further object is to provide a method of preparing the separate optical isomers of α-amino-α-phenylbutyric acid, i.e., the stated amino acid in either its $d$- or its $l$-form.

It is well known that optically active compounds often occur in nature in the form of a single isomer, e.g., the $l$-form. It is also well known that one form of many α-amino acids, usually the $l$-form, is useful for nutritional, medicinal, and other uses while its enantiomorph has little or no utility for the same purpose. A great deal of research has been directed to finding ways of resolving optically active amino acids into their separate isomers. However, most of the known prior art procedures for resolving α-amino acids are unsatisfactory, as they involve the preparation of diasterioisomers, or are otherwise tedious and impractical.

It has now been discovered that a racemate of an optically active hydantoin compound, 5,5-phenylethylhydantoin, can be resolved by crystallization from a solution containing unequal amounts of the enantiomorphs of the compound.

5,5-phenylethylhydantoin can be prepared from α-amino-α-phenylbutyric acid, or preferably its ethyl ester, according to the equation:

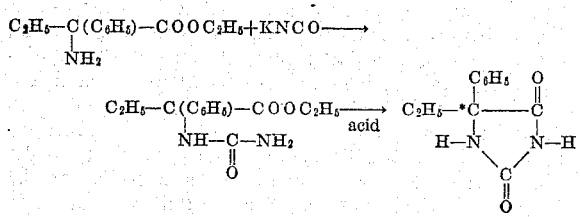

The carbon atom marked with an asterisk (*) is asymmetric. After the 5,5-phenylethylhydantoin is resolved into its optical isomers, the optical isomers can readily be converted into the optical isomers of α-amino-α-phenylbutyric acid by opening the hydantoin ring with barium hydroxide (Herbst et al., J.A.C.S., 54, 2463, 2468, June 1932).

My crystallization procedure involves dissolving an amount of the $dl$-form of 5,5-phenylethylhydantoin in a solvent in which it is sparingly soluble, usually by heating the compound and the solvent, adding a small amount of either the $d$- or the $l$-form of the compound, converting the solution into a supersaturated state, e.g., by cooling, seeding the solution with a small amount of the previously added enantiomorph, and separating the resulting crystals from the solution after a suitable time interval. Alternatively, the racemate and the separate $d$- or $l$-form can be dissolved at the same time, and the procedure carried out as above.

In the examples below, the following crystallization procedure was utilized, except when specified otherwise.

The charge of racemate and optically active modification was weighed into a test tube and the solvent was added. The test tube was equipped with a mercury seal stirrer and a semi-ball joint side arm, to which a condenser and drying tube were attached. The stirrer was started, and thorough agitation was maintained throughout the rest of the procedure. The contents of the tube were raised quickly to 55° C. and kept there for a short time, e.g., five minutes. The solution was then cooled by a hexane bath at a lower temperature, usually 20° C., and after one minute, the solution was seeded with the optically active modification. Cooling was continued for 30 minutes, and then the tube was removed and the supernatant fluid separated from the crystalline solids by suction filtration of the contents through a glass tube containing a sintered glass disc. The crystallized solids were dried to constant weight. The amount of one enantiomorph present in excess in the solids was determined by measuring (with a Kern polarimeter) the rotation of a methanol solution containing the solids in known concentration and calculating the amount of separate enantiomorph from the known specific rotation of the enantiomorph in methanol.

Some of the preliminary tests to determine the solubility of the 5,5-phenylethylhydantoin in the various solvents, and to determine the quantity of the compound which would remain in solution at stated temperatures, after seeding, are also recorded in the examples.

*Example 1*

In 10 ml. of methanol, 0.8 grams of $dl$-5,5-phenylethylhydantoin was dissolved by heating for 1 minute at 55° C. The solution was then cooled by a hexane bath at 20° C. After cooling for 1 minute, the solution was seeded with 0.0067 gram of the $dl$-form of the compound, and the solution was rapidly stirred for 30 minutes at 20° C. By evaporation of solvent from an aliquot of the solution, it was determined that 0.763 grams of the compound had remained in solution. In another determination in which 1 gram of $dl$-5,5-phenylethylhydantoin was dissolved in 10 ml. of methanol by heating for 2 minutes, 0.671 gram remained in solution. In a third determination in which 0.9 gram of compound was dissolved in 10 ml. methanol, 0.68 gram remained in solution.

*Example 2*

In 10 ml. methanol, 0.8 gram $dl$-5,5-phenylethylhydantoin and 0.08 gram of the $l$-form of the same compound were dissolved by heating for 5 minutes at 55° C. The solution was then cooled in a hexane bath at 20° C. After cooling for 1 minute, the solution was seeded with 0.0067 gram of the $l$-form of 5,5-phenylethylhydantoin, and cooling at 20° C. was continued for 30 minutes. Filtration of the solution gave 0.0996 gram of solids. In 10 ml. of methanol a fraction of the solids, 0.0896 gram, gave a rotation of $\alpha = 4.35°$ at 27° C. From this rotation the concentration (grams/100 ml.) was calculated:

$$C = \frac{\alpha \times 100}{[\alpha]_D^{27} \times 2} = \frac{-4.35 \times 100}{-120.8 \times 2}$$

$$= 1.81 \text{ grams}/100 \text{ ml.} = 0.0905 \text{ g.}/5 \text{ ml.}$$

The purity (P) is calculated by dividing the weight of pure isomer in the analyzed fraction of separated solids, by the weight of the analyzed fraction of separated solids, and in this case equals $$\frac{0.0905}{0.0896}$$

or approximately 100%. This indicates that the 0.0996 gram of separated solids was pure levo isomer and the resolution (R) was:

$$R = \frac{\text{wt. pure isomer separated} - (\text{wt. pure isomer added} + \text{wt. seed})}{\text{wt. of isomer in original charge of } dl}$$

$$= \frac{0.0996 - (0.08 + 0.0067)}{0.4} = 3.2\%$$

The specific rotation for use in calculating the concentration above was obtained by measuring the rotation of solutions of the $d$- and $l$-forms in methanol in concentrations of 3 grams/100 ml. solution at 27° C. The corrected values were +7.40° and −7.40° respectively, from which the specific rotation was calculated as $[\alpha]_D^{27°} = \pm 120.8°$ in 3% methanol solution.

Example 3

In 10 ml. of ethanol, 0.4 gram of $dl$-5,5-phenylethylhydantoin was dissolved by heating at 55° C. for 5 minutes, and the amount which would remain in solution after seeding at 20° C. for 30 minutes was determined by the procedure of Example 1. The compound remained in solution in an amount of 0.395 gram. When this procedure was repeated with 0.6 gram of the $dl$-compound, 0.505 gram remained in solution.

Example 4

In 10 ml. of ethanol was dissolved 5,5-phenylethylhydantoin, 0.6 gram of the $dl$-form, and 0.06 gram of the $l$-form, by heating for 5 minutes at 55° C. The seeding, crystallization and separation was conducted according to the procedure of Example 2, using the times and temperatures specified therein. The separated solids weighed 0.1285 gram; 0.0531 gram of the solids in 5 ml. of methanol gave a rotation of −2.30. Of the separated solids, 0.1154 gram was the $l$-form, for a purity of 90%, and a resolution of 16.3%.

In another run under approximately the same conditions, the purity of the separated product was 82.7% and the resolution was 13.3%.

Example 5

In 20 ml. of a 50:50 solution of ethanol and water, 0.4 gram of $dl$-5,5-phenylethylhydantoin was dissolved by heating at 55° C. for 30 minutes. The amount of the compound which remained in solution for 30 minutes at 20° C. after seeding was determined according to the procedure of Example 1 as 0.294 gram/20 ml. When 0.3 gram of the $dl$-compound was dissolved by heating at 55° C. for 10 minutes, approximately all of the 0.3 gram remained in solution. When 0.35 gram was similarly dissolved, 0.318 gram remained in solution.

Example 6

$dl$-5,5-Phenylethylhydantoin, 0.325 gram, and 0.0325 gram of the $l$-form of the same compound were dissolved in 20 ml. of aqueous ethanol (10 ml./10 ml.) in a test tube by warming at 55° C. for 10 minutes. The solution was cooled by immersing the test tube in a hexane bath at 20° C. for 1 minute, 0.0067 gram of $l$-5,5-phenylethylhydantoin was added as seed, and the cooling was continued for an additional 30 minutes. The solution was then filtered, and the solid material was dried and weighed, 0.0793 gram of solids being obtained. In 5 ml. of methanol, 0.0489 gram of the solids gave a rotation of −2.25° C. The purity of the product was 95.5%, and the resolution was 22.4%.

Example 7

In a crystallization in which 0.350 gram of $dl$- and 0.0350 gram of $l$-5,5-phenylethylhydantoin were dissolved in 20 ml. of 50:50 ethyl alcohol and water, and crystallized according to the procedure of the previous example, the purity of the product was 80.7% and the resolution was 6.9%.

Example 8

In 10 ml. methanol, 0.8 gram of $dl$-5,5-phenylethylhydantoin was dissolved by heating at 55° for 1 minute. The solution was cooled to 20° C., 0.0067 gram of $dl$-seed was added, and the solution was maintained at 20° C. for 20 minutes. Then 0.2 gram of levo-5,5-phenylethylhydantoin was added and dissolved by heating for 1 minute at 55° C. After cooling the solution for 1 minute at 20° C., the solution was seeded with 0.0067 gram of the $l$-form of the hydantoin compound, and the cooling at 20° C. was continued for an additional 15 minutes. The solids were filtered and weighed to give 0.0589 grams of material, approximately 100% of which was the desired $l$-form of 5,5-phenylethylhydantoin.

Example 9

In 10 ml. of methanol 0.8 grams of the $dl$-form and 0.2 gram of the $l$-form of 5,5-phenylethylhydantoin were dissolved and crystallized according to the procedure of Example 2 except that the crystallization was caused to take place at 10° C. The 0.3309 grams of crystallized solids had a purity of 61.4%.

Example 10

A crystallization in methanol was conducted according to the procedure of Example 2, except that the solution was cooled at 20° C. for forty minutes prior to separation of the solids. The solution was 1% and the purity was 86.5%.

Example 11

In a crystallization from ethanol and water conducted according to the procedure of Example 6 except that the cooling time was 35 minutes, 0.0425 gram of solids was separated, of which the purity was 85.2%.

While the examples above involve separation of the levo-isomer, as this isomer is usually of greater interest, it will be recognized that the same procedure can be used to separate the dextro-isomer, by simply crystallizing from solutions containing excess dextro-isomer, and by seeding the solutions with the dextro-isomer. Moreover, it is apparent that after the crystallized solids are separated from the mother liquor in the above examples in which resolution was achieved, the mother liquor will be rich in the enantiomorph opposite to that in which the crystallized solids are rich. This makes it possible to conduct a series of directed alternate crystallizations of the 5,5-phenylethylhydantoin to separate both the $d$- and $l$-forms from a racemic mixture. In such a procedure, once a solution containing unequal amounts of enantiomorph is obtained, it is only necessary to add sufficient of the $dl$-form in each step to make up the solution to the desired concentration and ratio of $d$- or $l$-form to $dl$-form. It is usually desirable to add sufficient of the racemic form to make the total concentration of the compound in the solution up to a constant supersaturated point, although the total concentration can desirably be lowered slightly when the ratio of optically active form to racemate is increased. Of course, the separate, collected fractions of the two isomers can be separately recrystallized from the same or different solvents than those used for the separation procedures. For such recrystallizations it is usually desirable to use approximately the amount of solvent required to dissolve all of the racemic mixture in the separate, collected fractions, in order to crystallize the individual isomers in the pure state. If desired, either isomer can be racemized by known racemization procedures, and the racemate can then be resolved by my crystallization procedure, thus, in effect, converting one isomer into the other.

The good resolution and purity obtained in some of the above examples indicates that a racemic mixture of 5,5-phenylethylhydantoin can be efficiently separated into its optical isomers by a small number of crystallization steps. This represents a big improvement over prior art resolution procedures.

Under the conditions stated in a few of the examples, no resolution was achieved, but a fairly pure product separated. This indicates that resolution can be accomplished under the stated conditions by making slight, compensating adjustments in some of the other crystallization conditions or concentrations.

My crystallization procedure is preferably conducted in a solvent in which 5,5-phenylethylhydantoin is sparingly soluble at the chosen crystallization temperature, but in which the compound can be dissolved and from which it can be crystallized and separated in substantial amounts in a practical operating range of temperatures, e.g., 0° C. to 80° C. It is also desirable that the solvent be one in which the racemic mixture of the compound has a greater solubility or tendency toward supersaturation than the optically active form at the chosen crystallization temperature. Among the suitable solvents are alcohols, particularly lower alcohols, e.g., ethyl alcohol, methyl alcohol, propyl alcohol, isopropyl alcohol, aqueous alcoholic solutions, e.g., aqueous solutions of ethyl alcohol; and alcoholic ether solutions, e.g., a solution of ethanol and ethyl ether. It is generally preferred to use organic solvents, or mixtures of organic solvents and water. It is desirable to use solvents in which the 5,5-phenylethylhydantoin is sparingly soluble, e.g., soluble to the extent of about 0.1 gram to 1 or 2 grams or more per 10 ml. of solution. It is not understood why solvents holding these amounts of the compound are more satisfactory than other solvents. It may be that it is necessary to have a certain concentration of the compound present in order to have the proper number of molecular collisions or some such phenomena to produce the desired resolution, and that the factor of the degree of solubility (insolubility) is just incidental to the resolution, although necessary to obtain crystallization. However, I do not wish to be bound by this, or any other theory of the mechanism of my resolution procedure, as it is clear that resolution can be achieved under the conditions taught herein, regardless of what the mechanism may be.

In order to obtain crystallization and resolution of a racemic mixture of 5,5-phenylethylhydantoin, it is necessary that the total amount of racemic mixture and active form of the compound in solution exceed the maximum supersaturation amount. The maximum supersaturation amount is the maximum amount of compound which the solvent will hold in solution at a given temperature for a given cooling or crystallization time after seeding (equilibrium not being attained). It can be seen from Example 1 that the maximum supersaturation for 5,5-phenylethylhydantoin approaches 0.8 gram at 20° for 30 minutes in 10 ml. methanol, and Example 5 shows that the value in 20 ml. of 50:50 aqueous ethanol solution is about 0.32 gram. These values could be determined more precisely by conducting additional solubility tests, and plotting a curved based on the amounts remaining in solution, but the above fairly accurate maximum supersaturation amounts are entirely adequate for choosing operative concentrations. The values are based upon solubility data for the racemic mixture. The maximum supersaturation amounts are greater for higher temperatures and lesser for lower temperatures.

In order to have unequal amounts of the enantiomorphs in solution, it is necessary to have some of the optically active modification present. However, the ratio of the amount of optically active modification to the amount of racemic mixture in the solution for resolution can vary considerably, e.g., from about 1 part/50 parts to 1 part/4 parts, the parts being by weight. It is usually preferred to have in 10 ml. of solution, about 0.1 to 1 gram of racemic mixture, and 0.01 to 0.2 gram of active form. The total amount of the compound in solution can vary from just above the maximum supersaturation amount to about 1.3 or more times the maximum supersaturation amount.

The crystallization temperature can be varied, although it is usually desirable to use a temperature in the range of 10° C. to 30° C. By "crystallization temperature" is meant the temperature at which crystallization is permitted to occur.

The terms "cooling time" or "crystallization time" herein refer to the actual times the solution is held at the crystallization temperature, as the cooling is almost instantaneous under the conditions used in the examples. The cooling time can vary considerably, but 20 to 40 minutes usually gives the most efficient separation with the apparatus used in the examples, about 30 minutes being preferred.

While the preferred method of inducing supersaturation and crystallization is by cooling and seeding the solutions of enantiomorph, it will be realized that other means of causing insolubility and precipitation can be used, e.g., adding non-solvents or poor solvents for the enantiomorph, such as the addition of water to an ethanol solution of the enantiomorphs; and that such other means can be used alone or in combination with cooling means; the term "crystallizing" is intended to cover all such fractional precipitation methods.

While the crystallization and resolution occurs from supersaturated solutions containing unequal amounts of the enantiomorphs of 5,5-phenylethylhydantoin, non-saturated solutions containing unequal amounts of these enantiomorphs are also useful and valuable intermediates, as such non-saturated solutions can be readily converted to supersaturated solutions by the addition of the dl-form of the compound, or by evaporation of the solvent or cooling of the solution.

For seeding the supersaturated solutions containing an excess of one enantiomorph, any substantial but reasonably small amount of seed can be used. It has been found convenient to use a spatula delivering amounts of the compound of the order of 0.0067 gram in the procedure of the above examples.

In preparing the solutions of enantiomorphs, it is possible to dissolve the enantiomorphs at any temperatures which will cause solution but will not cause degradation of the enantiomorphs. Temperatures of the order of 50° to 110° C. are usually convenient.

The racemic 5,5-phenylethylhydantoin which is resolved by the procedure of the present invention is a known compound which has been used as a hypnotic drug under the name "Nirvanol." The compound can be prepared by any of the procedures known to the art. For example, it is conveniently prepared from phenylethyl ketone by way of phenylethyl-amino-acetonitrile according to the procedure, of Read, J.A.C.S. 44, 1746 (1922).

The resolution procedure and solutions of the present invention have valuable utility in preparing the optical isomers of 5,5-phenylethylhydantoin and α-amino-α-phenylbutyric acid, not only because of the superior biological properties of the separate isomers, but also because it has recently been discovered that superior fiber and film forming polypeptide and polyamide resins can be prepared from optically active amino acids and amino compounds.

A method of resolving 5,5-phenylethylhydantoin into its optical isomers by a straightforward crystallization procedure has been described. This resolution provides a method of preparing the separate optical isomers of α-amino-α-phenylbutyric acid, as 5,5-phenylethylhydantoin is readily converted to α-amino-α-phenylbutyric acid. Solutions containing unequal amounts of the enantiomorphs of 5,5-phenylethylhydantoins, which are useful intermediates in the resolution of the compound are also described.

I claim:
1. The method of resolving a racemic mixture of

5,5-phenylethylhydantoin enantiomorphs which comprises causing the levo-form to crystallize from an alcoholic solution comprising 0.1 to 1 gram of racemic mixture and 0.01 to 0.2 gram of levo-form per 10 ml. alcohol, at a temperature of 10° to 30° C. and separating the resulting crystals from the solution before equilibrium is attained and within 20 to 40 minutes, the total amount of 5,5-phenylethylhydantoin in the said alcoholic solution being above the maximum supersaturation amount, but not more than 1.3 times above and the amount of levo-form being less than the amount of said form which will crystallize in the crystallization time.

2. The method of claim 1 in which the said solution comprises about 0.8 gram of the racemic mixture in 10 ml. methanol.

3. The method of claim 1 in which the said solution comprises about 0.6 gram of racemic mixture in 10 ml. ethanol.

References Cited in the file of this patent

UNITED STATES PATENTS 1,861,458   Sobotka _____ June 7, 1932

OTHER REFERENCES

Gilman: Organic Chemistry, vol. 1, pp. 187–9 (1938). John Wiley and Sons, Inc., New York.